Sept. 10, 1957  R. H. MILLER  2,805,501
APPARATUS FOR USE IN BULK PREPARATION OF INFANTS' FORMULAS
Filed Nov. 30, 1953  3 Sheets-Sheet 1
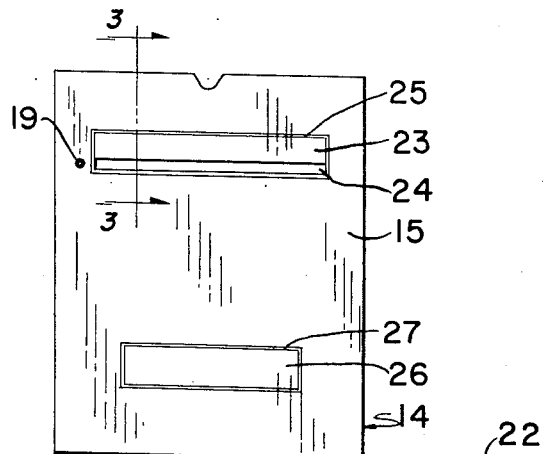
FIG. 1
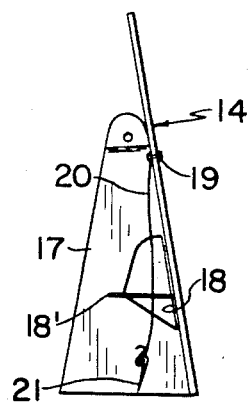
FIG. 2.
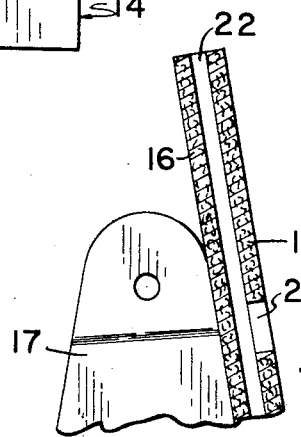
FIG. 3.
| NO. OF BABIES | LACTUM | | WATER | | | FORMULA | |
|---|---|---|---|---|---|---|---|
| | Cans | Oz. | Gal. | Qt. | Oz. | Total Oz. | No. of Bottles |
FIG. 4.
| Lactum..........11 ounces | CALORIC DISTRIBUTION |
|---|---|
| Water.............11 ounces | Protein.............16% |
| | Fat...................34% |
| Ounces per bottle:3 | Carbohydrate.......50% |
| | Total calories: 440 |
| | Calories per ounce:20 |
FIG. 5.
INVENTOR.
ROBERT H. MILLER
BY Bertha L. MacGregor
ATTORNEY Sept. 10, 1957 R. H. MILLER 2,805,501
APPARATUS FOR USE IN BULK PREPARATION OF INFANTS' FORMULAS
Filed Nov. 30, 1953 3 Sheets-Sheet 2

Lactum............11 ounces
Water.............11 ounces
Ounces per bottle: 3

CALORIC DISTRIBUTION
Protein................16%
Fat....................34%
Carbohydrate..........50%
Total calories: 440
Calories per ounce: 20

| NO. OF BABIES | LACTUM | | WATER | | | FORMULA | |
|---|---|---|---|---|---|---|---|
| | Cans | Oz. | Gal. | Qt. | Oz. | Total Oz. | No. of Bottles |
| 1 | | 11 | | | 11 | 21 | 7 |
| 2 | 1 | 9 | | | 22 | 42 | 14 |
| 3 | 2 | 7 | | 1 | 1 | 63 | 21 |
| 4 | 3 | 5 | | 1 | 12 | 84 | 28 |
| 5 | 4 | 3 | | 1 | 23 | 105 | 35 |
| 6 | 5 | 1 | | 2 | 2 | 126 | 42 |
| 7 | 5 | 12 | | 2 | 13 | 147 | 49 |
| 8 | 6 | 10 | | 2 | 24 | 168 | 56 |
| 9 | 7 | 8 | | 3 | 3 | 189 | 63 |
| 10 | 8 | 6 | | 3 | 14 | 210 | 70 |
| 11 | 9 | 4 | | 3 | 25 | 231 | 77 |
| 12 | 10 | 2 | 1 | | 4 | 252 | 84 |
| 13 | 11 | | 1 | | 15 | 273 | 91 |
| 14 | 11 | 11 | 1 | | 26 | 294 | 98 |
| 15 | 12 | 9 | 1 | 1 | 5 | 315 | 105 |
| 16 | 13 | 7 | 1 | 1 | 16 | 336 | 112 |
| 17 | 14 | 5 | 1 | 1 | 27 | 357 | 119 |
| 18 | 15 | 3 | 1 | 2 | 6 | 378 | 126 |
| 19 | 16 | 1 | 1 | 2 | 17 | 399 | 133 |
| 20 | 16 | 12 | 1 | 2 | 28 | 420 | 140 |
| 21 | 17 | 10 | 1 | 3 | 7 | 441 | 147 |
| 22 | 18 | 8 | 1 | 3 | 18 | 462 | 154 |
| 23 | 19 | 6 | 1 | 3 | 29 | 483 | 161 |
| 24 | 20 | 4 | 2 | | 8 | 504 | 168 |
| 25 | 21 | 2 | 2 | | 19 | 525 | 175 |

*FIG. 6.*

INVENTOR.
ROBERT H. MILLER
BY Bertha L. MacGregor
ATTORNEY

Sept. 10, 1957   R. H. MILLER   2,805,501
APPARATUS FOR USE IN BULK PREPARATION OF INFANTS' FORMULAS
Filed Nov. 30, 1953   3 Sheets-Sheet 3

INVENTOR.
ROBERT H. MILLER
BY Bertha L. MacGregor
ATTORNEY

United States Patent Office 2,805,501
Patented Sept. 10, 1957

2,805,501

APPARATUS FOR USE IN BULK PREPARATION OF INFANTS' FORMULAS

Robert H. Miller, Jamaica Estates, N. Y., assignor to Mead Johnson & Company, Evansville, Ind., a corporation of Indiana Application November 30, 1953, Serial No. 395,243

2 Claims. (Cl. 40—64)

This invention relates to apparatus for use in bulk preparation of infants' formulas, particularly adapted for use in hospitals and the like where a number of infants are fed daily and where the number may vary from day to day.

Heretofore formulas have been prepared on an individual-baby basis, the calculations for determining the proportions and quantities of ingredients and the mixing of the ingredients having been entrusted to formula room nurses. This procedure necessarily involved repetition, within each daily period, of the series of steps required for producing the formulas; lengthy calculations for determining the proportions and quantities of the ingredients, and remaking of formulas in case of preparation errors.

The object of this invention is to provide apparatus for use in bulk preparation of infants' formulas which will reduce the time required for the preparation by at least fifty percent; which will reduce possibility of error in calculations and preparations to a minimum; which will simplify the procedure of formula preparation and permit use of non-professional help in the formula room; and which will substantially lower the cost of operation of the formula room.

By using apparatus embodying my invention, formula room personnel are relieved of the need for making calculations for determining the quantities of ingredients required for the feeding of one or more babies for a predetermined period of time. Further, they are relieved of the task of preparing formulas on an individual-baby basis and of repeating the cycle of steps for additional babies. Another advantage resulting from the use of my apparatus is the convenience of being supplied with calculations which state the required quantities of ingredients in units which may be measured in the quickest possible time and handled with the fewest motions.

My apparatus also supplies data stating the caloric distribution and the caloric content of the specified ingredients, whereby the use of calorically balanced formulas may be established. A formula of preferred caloric distribution is one which provides 15% of calories from protein, 35% of calories from fat and 50% of calories from carbohydrates.

The apparatus hereinafter described, embodying my invention, comprises a plurality of charts and envelopes or cases for receiving the charts. Each hospital or the like requires a number of charts, usually three or more, each bearing on its face the calculations and other data relating to a formula used by that institution.

Each chart preferably is encased in a case provided with a window through which a portion of the chart is selectively exposed. A portion of the data on the chart, hidden by the case when the chart is positioned therein, preferably is reproduced on the case in position to clarify the meaning of the data visible through the window. To avoid the expense of providing cases having directly imprinted thereon the data which corresponds to some of the data on the chart to be inserted therein, I have provided inexpensive means whereby all cases initially may be identical and be produced in quantity. To this end, the cases are provided with blank areas adjacent the window, and gummed stickers bearing data corresponding to some of the data on a selected chart are affixed to said blank areas on the case intended for encasing that chart.

The cases for receiving the charts embodying my invention are self-supporting in a substantially vertical position so that the reading matter on a case and chart inserted therein is conveniently visible to the person preparing formulas with the aid of my apparatus. Further, the case and chart are provided with means whereby a single line of data stating quantities of ingredients constituting the formula for a specified number of babies is exposed through the window of the case, and the chart is realined in the selected position relatively to the case.

The operation of my invention, and the above mentioned and other advantages resulting from the use thereof in the bulk preparation of infants' formulas will be fully explained in the following specification and by reference to drawings.

In the drawings:

Fig. 1 is a front elevational view of a case, on a reduced scale, comprising part of the apparatus embodying my invention.

Fig. 2 is a side elevation of the case shown in Fig. 1.

Fig. 3 is a vertical sectional view, on an enlarged scale, of a detail of construction, taken in the plane of the line 3—3 of Fig. 1.

Figs. 4 and 5 are plan views of gummed printed paper stickers adapted for attachment to the case shown in Fig. 1.

Fig. 6 is a plan view of a chart which is part of the apparatus of my invention.

Figure 7:
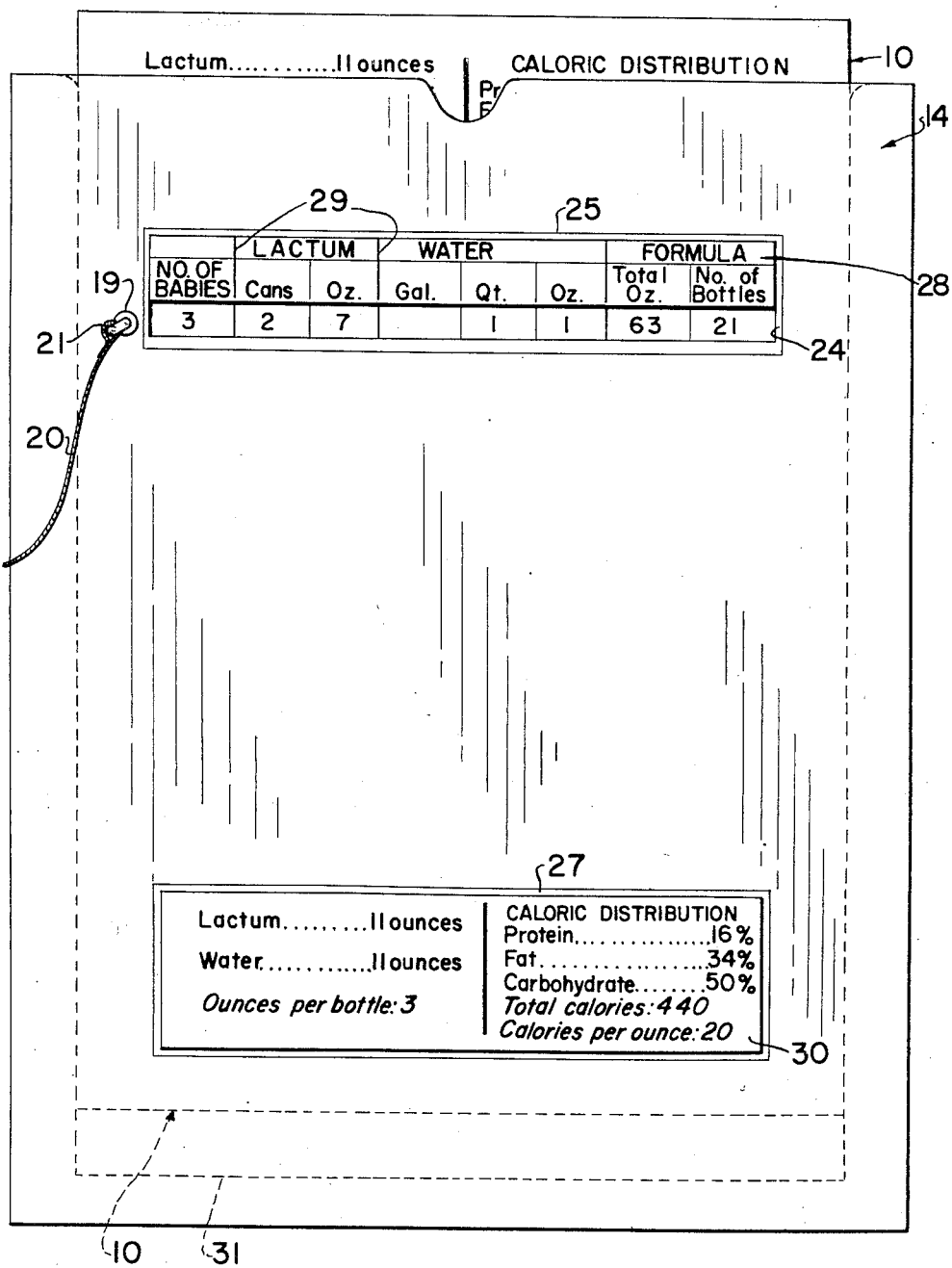
Fig. 7 is a plan view of a case and chart therein.

Referring first to the preferred form of chart embodying my invention, shown in Fig. 6, it will be understood that this chart is representative of an unlimited number of charts having imprinted thereon different formulas and data and calculations relating thereto. Preferably I make the chart, indicated as a whole at 10, of a single flat sheet of heavy relatively stiff paper, about 8 by 11 inches in area.

In this specimen chart, the formula calls for 11 ounces of "Lactum" (the registered trademark of Mead Johnson & Company for its modified milk liquid formula for infants) and 11 ounces of water, which when mixed together provide sufficient of the formula (with slight excess) to prepare 7 feedings of 3 hounces each, the 3 ounce portions being placed in separate bottles, refrigerated, and used as needed. The formula ingredients and ounce-per-bottle data appear in the upper left hand area 11 of the chart. In the opposite right hand upper area 12, the chart carries data stating the caloric distribution; in this formula, protein 16%, fat 34% and carbohydrate 50%; total calories 440 and calories per ounce 20.

Below the line 13, the chart is divided into columns by vertical lines, and a series of horizontal lines equally spaced apart divide the columns into rectangular areas or lines on which data is imprinted. The number of vertical columns depends on the number of ingredients, which in this formula are two, plus one column indicating the number of babies and another column headed "Formula" indicating the total ounces and the number of bottles.

The data between the horizontal lines indicates the number of babies and the calculations of quantities of ingredients needed to produce the total ounces and number of bottles required for that number of babies for the selected feeding period, usually a 24 hour period.

Referring to the first vertical column at the left side of the chart, it will be noted that under the heading "No.

of Babies," this column has imprinted thereon, in succession, the numerals 1 to 25 inclusive. The second column from the left, under the heading of the ingredient "Lactum," is divided into two columns headed "Cans" and "Oz." Since "Lactum" is prepared as a fluid in cans containing 13 fluid ounces, the required quantities for one to twenty five infants can be stated in terms of ounces or of cans and ounces. The third column from the left, under the heading of the ingredient "Water," is divided into three columns headed "Gal." "Qt." and "Oz." respectively. The remaining, right hand column, under the heading "Formula," is divided into two columns headed "Total Oz." and "No. of Bottles," respectively.

The convenience of having these calculations for the use of the personnel of the formula room of a hospital is obvious. Without the chart, the person preparing the formulas for, say, twenty five babies, would measure the quantity specified for the individual-baby formula and prepare the mixture, and then repeat the cycle of steps twenty five times; or the operator might make calculations for twenty five babies by multiplying 11 by 25 to determine the number of ounces of "Lactum" needed. Similarly, the calculation of the number of ounces of water required for twenty five babies would result in a number of ounces, and require more calculations to reduce them to gallons, quarts or other units, to avoid having to deal with 25 separate measurements of the single unit requirements of 11 ounces of water.

Each day, without the charts, the person preparing the formulas would have to make calculations for determining the quantities of ingredients required, depending on the number of babies to be fed that day; or, would have to repeat the preparation steps until the required number of feedings had been produced.

The formula and chart herein described for purposes of illustration require relatively simple calculations because the two ingredients are fluids. When the formula includes an ingredient in powder form, the individual baby daily formula calls for a number of level tablespoons of the stated ingredient. Frequently the formula includes three different ingredients, measured in different units, which makes calculations difficult, and results in errors and consequent loss of time and material, and possible injury to the infants for whom the formulas are being prepared.

Referring to Figs. 1, 2 and 3, the envelope or case 14 as a whole comprises a front wall 15, rear wall 16 parallel to the front 15, supporting leg 17 fixed to the rear wall 16 by a portion 18. The leg 17 has a brace 18'. An eyelet 19, preferably of metal, extends through the walls 15 and 16, and a cord 20 attached to the rearward side of the eyelet, has an eyelet-pin 21 secured to its free end.

The front and rear walls of the case 14 are made of flat, relatively stiff cardboard or paper, secured together in any suitable manner along the two side edges and the bottom of the case, leaving the upper edges of the walls 15 and 16 free and spaced as indicated at 22 in Fig. 3. Preferably the connected edges of one or both walls are inturned to provide means for slightly spacing the walls apart in order to permit of insertion of the chart 10 into the envelope or case through the upper opening.

Below the upper edge of the case 14 and spaced therefrom is a blank area 23, rectangular in form, as shown in Fig. 1, and below this area 23 is a window 24 formed by cutting through the front wall 15. The window 24 is narrow in its vertical dimension, equal to the space occupied by the column headings of the chart 10, and almost as wide as the chart. The blank area 23 and the window 24 are defined by a border 25 which extends around the top of the blank area, the bottom of the window, and the side edges of both.

Below the window and relatively near the bottom of the case 14 is another blank area indicated at 26, rectangular in shape, as defined by the border 27 which extends around its top, bottom and side margins (Fig. 1).

Figs. 4 and 5 are on the same scale as Figs. 6 and 7. Fig. 4 shows a gummed piece of paper 28 which matches in size that portion of the chart 10 on which are printed the headings of the columns indicating the number of babies, the ingredients and their measuring units, the formula total ounces and number of bottles. The vertical lines 29 of the gummed sticker 28 register with the vertical lines which divide the several columns of the chart 10. The stick 28 is designed to be affixed to the blank area 23 adjacent the window 24, on the face of the case 14, and when properly affixed within the border 25, the data on the member 28 will serve as column headings for the exposed line of the chart 10 visible through the window in the case.

The gummed piece of paper 30, shown in Fig. 5, has imprinted thereon the data which appears on the areas 11 and 12 of a chart. The member 30 is designed to be affixed over the blank area 26, within the border 27 of the case 14.

The cases 14, as shown in Figs. 1, 2 and 3, initially are identical and may be produced economically in quantity. Gummed stickers 28 and 30 are low in cost and are prepared in quantities equal to the number of charts which bear formula data corresponding to that on the stickers. In the event a certain formula is discarded, the case need not be wasted for it is feasible to apply other stickers having imprinted thereon the formula data corresponding to the chart substituted for the discarded one.

The assembled case 14 and chart 10 are shown in Fig. 7. The dotted line 31 indicates the inturned edge of one of the walls 15 or 16 which spaces the two walls from each other and provides space between them for the chart 10. As shown in Fig. 6, the chart 10 is provided with a series of holes 32 adjacent its left edge, one hole 32 between each pair of horizontal lines on the chart. If the chart is inserted in the case so as to be completely encased, the space bearing the designation "1," indicating one baby, and the rest of the data opposite that designation, will be visible through the window 24 of the case. In Fig. 7, the chart is shown as protruding to some extent from the upper open end of the case 14, so that the designation "3," indicating 3 babies, and the rest of the data on that line, is visible through the window 24. To insure that the chart will be retained in the selected position, the pin 21 is inserted through the eyelet 19 of the case and the registering hole 32 opposite the baby designation "3" of the chart. Now the person preparing the formula can see that, for 3 babies, she will require 2 cans and 7 ounces of "Lactum" and 1 quart and 1 ounce of water, to provide at least 63 ounces of the formula to be divided into 21 bottles containing 3 ounces each, to make 7 feedings per baby in the feeding period of 24 hours.

The chart 10 may be moved relatively to the case to expose any one of the 25 lines of data, and the selected position will be retained by the insertion of the pin 21 through the registering holes in case and chart. The case and inserted chart can be placed in self-supporting substantially upright position in a convenient place, readily visible to the person who is preparing the formula. Regardless of the size or kind of container in which each of the ingredients is made available to the formula personnel, the quantity calculations on the chart indicate the most convenient and labor-time-saving units of measurement for preparing the formula. For example, for one baby the quantity of water in the formula may be 11 ounces; however, for twelve babies the calculation is not stated in ounces, but in the more convenient and time saving unit of 1 gallon and 4 ounces, and for twenty three babies in the unit of 1 gallon, 3 quarts and 29 ounces.

It will be understood, of course, that the data appearing on the chart 10 illustrated in the drawing is merely one example of an unlimited number of formula charts, and that the gummed stickers 28 and 30 likewise represent only one example of the stickers bearing other data to correspond with other charts. Further, the form of the charts and cases may be altered, without departing from the essential features of the invention, defined by the appended claims.

I claim:

1. A changeable exhibitor for use in the bulk preparation of desired infants' formulas, said exhibitor comprising a changeable means having transverse lines of quantitative measures of ingredients to be used in preparing the desired formulas, longitudinal division lines dividing the ingredients into columns of progressively increasing quantitative measures for the respective formulas, each column having one measure for each line, an elongated flat tubular casing, open at one end, said casing having a face portion thereof defining a framed area and a narrow window opening disposed adjacent said framed area, said window opening extending across said face of the casing adjacent the open end thereof, said casing defining a pocket receiving said changeable means, a changeable quantitative indicating scale means within the framed area in juxtaposition to said window, said scale means having division lines corresponding respectively to those of the changeable means, said changeable means being changeable from one desired formula to another desired formula to indicate the quantitative measures of ingredients to be used in preparing the selected formula by exposing the quantity of ingredients to be used through the window opening according to the adjacently disposed corresponding scale means with the quantities of ingredients not desired being hidden, and co-acting positioning means retaining and locking the changeable means in the desired position relative to the scale means.

2. The changeable exhibitor as set forth in claim 1 wherein said co-acting positioning means comprises a series of longitudinally aligned apertures adjacent an edge of said changeable means, one intermediate each transverse line, an aperture in the casing adjacent an end of the window opening and registerable with a selected one of said longitudinally aligned apertures in said changeable means to position a selected line in the window opening, and a pin attached to the casing and insertable in the registered apertures to positively retain the changeable means in the selected position relative to the window opening and scale means.

References Cited in the file of this patent

UNITED STATES PATENTS

| | | | |
|---|---|---|---|
| 798,987 | Whitaker | Sept. 5, | 1905 |
| 1,266,610 | Moerk | May 21, | 1918 |
| 1,446,687 | Beals | Feb. 27, | 1923 |
| 1,513,027 | Belli | Oct. 28, | 1924 |
| 1,603,847 | Harper | Oct. 19, | 1926 |
| 1,732,983 | Orchard | Oct. 22, | 1929 |
| 1,937,277 | Kaffine | Nov. 28, | 1933 |
| 1,957,112 | Smith | May 1, | 1934 |
| 2,171,873 | Gould | Sept. 5, | 1935 |
| 2,262,278 | Godley | Nov. 11, | 1941 |
| 2,673,413 | Weber | Mar. 30, | 1954 |